United States Patent [19]
Riew et al.

[11] 3,966,837
[45] June 29, 1976

[54] COMPOSITIONS CONTAINING EPOXY RESIN, CHAIN EXTENDER, FUNCTIONALLY TERMINATED ELASTOMER AND CURING AGENT

[75] Inventors: Changkiu K. Riew, Akron; Alan R. Siebert, Maple Heights; Eugene H. Rowe, Akron, all of Ohio

[73] Assignee: The B. F. Goodrich Company, Akron, Ohio

[22] Filed: Dec. 20, 1971

[21] Appl. No.: 210,156

[52] U.S. Cl. .................... 260/837 R; 260/830 R; 260/836
[51] Int. Cl.² ..................................... C08G 45/04
[58] Field of Search ................. 260/836, 837, 830

[56] References Cited
UNITED STATES PATENTS 3,678,130   7/1972   Klapprott ..................... 260/836
3,678,131   7/1972   Klapprott ..................... 260/836

Primary Examiner—Murray Tillman
Assistant Examiner—T. Pertilla
Attorney, Agent, or Firm—James R. Lindsay

[57] ABSTRACT

Hard and strong epoxy resin products of high impact resistance are made from a di-epoxy compound, a smaller than equivalent proportion of chain extender which is preferably a bis-phenol, and about 5% (based on the amount of the di-epoxy compound) of a functionally terminated elastomer which is preferably a phenol terminated liquid copolymer of butadiene and acrylonitrile, together with a curing agent active at elevated temperatures.

6 Claims, No Drawings

COMPOSITIONS CONTAINING EPOXY RESIN, CHAIN EXTENDER, FUNCTIONALLY TERMINATED ELASTOMER AND CURING AGENT

CROSS REFERENCE TO RELATED APPLICATION

Certain of the functionally terminated elastomers used in this invention are disclosed in the application for patent of Riew, entitled "Phenol Terminated Elastomers", filed Dec. 17, 1971, Ser. No. 209,417.

BACKGROUND OF THE INVENTION

Epoxy resins have been widely used for many years in making solid products, including molding compositions and fiber reinforced structural plastics, and also casting or potting compositions, as well as coatings and adhesives. Epoxy resins are particularly advantageous because they are easily converted from liquid or pasty or thermoplastic initial materials into strong and chemically resistant thermoset products, with minimum shrinkage and without evolution of volatile materials. Nevertheless, such compositions tend to be brittle when they are sufficiently crosslinked to exhibit a desirably high heat distortion temperature, and previous attempts to diminish the brittleness and produce a high impact resistance by the usual means, such as introduction of plasticizers or flexibilizers, have not been completely satisfactory because other desirable properties, such as strength, have been sacrificed. Accordingly, an object of this invention is production of thermoset epoxy resin compositions which are not brittle but have a high resistance to impact and crack propagation without reduction of strength.

SUMMARY OF THE INVENTION

In this invention, a di-epoxy compound is combined with a chain extender, a ross-linking agent, and about 5% (based on the weight of the di-epoxy compound) of a functionally terminated elastomer. When heated for the proper time, such a combination sets up to a strong and rigid product which exhibits a very high resistance to impact and crack propagation, without loss of strength or modulus.

The epoxy constituent should contain two terminal epoxy groups as the principal reactive groups. Many such materials are known, including di-epoxy ethers of diphenols such as the diglycidyl ether of bisphenol A, di-epoxy esters of dicarboxylic acids such as diglycidyl adipate, and di-epoxy derivatives of dienes such as butadiene dioxide or vinyl cyclohexene dioxide. Many others are disclosed in various publications, such as the "Handbook of Epoxy Resins" by Lee and Neville, McGraw-Hill Book Co., New York, 1967. It is preferred that the epoxy constituent contain no more than two epoxy groups, since a greater number of reactive groups in a single constituent might result in premature cross-linking, which is undesirable in this invention.

The chain extender may be any of the difunctional materials known to be reactive with epoxy compounds at temperatures substantially above room temperature, such as diphenols, dibasic acids, or dimercaptans. For example, resorcinol, bisphenol A, bisphenol S, azelaic acid, phthalic acid, or m-dithio benzene may be used. It is presently preferred that the material used as a chain extender contain only two functional groups, as the presence of three or more functional groups reactive with epoxy groups might result in undesirable premature cross-linking, as mentioned above. In addition, highly reactive materials, of which primary amines and secondary diamines are typical, are not preferred, since they tend to react at room temperature, so that the reaction is difficult to control and the materials remain workable for only a very short time after mixing.

The cross-linking agents, sometimes called catalysts or curing agents, are the materials which, either by direct reaction or indirectly by preliminary decomposition followed by a reaction, are capable of attacking residual functional groups at reasonably elevated temperatures to connect the polymer chains and produce an adequately cross-linked and, therefore, satisfactorily thermoset final product. A great many materials known to be hardening or cross-linking agents for epoxy resins are disclosed in the "Handbook of Epoxy Resins" already mentioned. Those presently preferred are tertiary or secondary amines or similar nitrogenous bases such as are sometimes designated "Lewis bases", or their salts, including such widely used materials as tris (dimethylaminomethyl) phenol, piperidine, dicyandiamide, triethylene tetramine, and the like.

The functionally terminated elastomer may be any of a great many types of linear polymers having a backbone of such a character that it is more or less rubbery or elastomeric at the intended temperature of service of the product, with each chain molecule containing two, or at most, a small number of, groups reactive with epoxy groups. This elastomer constituent is preferably one which is compatible with, that is, soluble in, the particular type of epoxy material selected, in its unreacted condition, but having only a limited solubility in the reaction product of the di-epoxy compound with the chain extender, so that it will separate as minute particles or domains of a separate phase. In addition, it is desirable that the reactive end groups of the elastomer have a reactivity toward epoxy groups not greater than the reactivity of the chain extender. Moreover, the proportion of elastomer should be small, and preferably about 5% based on the weight of the di-epoxy compound, so that it will not significantly decrease the strength or modulus of the matrix material. However, as little as 2 ½% will give good results, and as much as 7 ½% may be used without significant loss of strength of the product. Such elastomers include functionally terminated chain polymers of various kinds, including polymers of dienes such as butadiene, chlorobutadiene, or isoprene; copolymers of dienes with each other or with ethylenically unsaturated compounds, such as copolymers of butadiene with styrene, acrylonitrile, or ethyl acrylate; butyl rubber; ethylene-propylene rubber; polymers of epichlorohydrin or other polyether elastomers; polysilicones; elastomeric polyamides or polyamines; and the like, in each case with a small number, preferably two, functionally reactive groups, which are preferably the terminal groups of the chain molecule.

Suitable functionally terminated elastomers include those having hydroxyl, mercapto, carboxyl, or amino groups, preferably carboxyl or phenolic hydroxyl, at or near the ends of the chain molecules. Such materials include amine terminated polyamides, such as nylon finished by reaction with a small excess of a diamine; functionally terminated polyethers such as primary amine terminated poly-tetramethylene-oxide or poly-epichlorohydrin or poly-ethylene oxide; mercapto terminated alkyl acrylate polymers such as copolymers of ethyl acrylate with a little butyl acrylate; carboxyl terminated liquid polymers or copolymers of butadiene or other dienes; and the like. Experience has shown that it is desirable for the reactivity of the functional groups toward epoxy groups to approximate the reactivity of epoxy groups toward one another, so as to assure bonding of the elastomer chains to the final cross-linked epoxy matrix, but only after chain extension has occurred and small particles or domains of elastomer appear as a separate phase. It is presently preferred that the functionally reactive groups be carboxyl or phenolic hydroxyl groups, and if they are either much more or much less reactive than phenolic hydroxyl, to convert them to phenolic hydroxyl or other functional groups of similar reactivity, as will be explained in more detail in the following description.

When the four essential constituents are properly compounded and appropriately heated, it will be found that the initial reaction will tend to be a great increase in molecular weight by reaction of the epoxy compound with the chain extender to produce an intermediate condition in which the material becomes a relatively strong solid at room temperature, but still thermoplastic. This will cause precipitation of the elastomer in the form of small particles of a separate phase imbedded in the matrix of high molecular weight epoxy product. Finally, the cross-linking will convert the matrix of epoxy product to a strong thermoset condition and will also cause the functional end groups of the elastomer to bond the elastomer domains to the epoxy matrix.

Not only should the elastomer component be present in a definitely limited small proportion, as has already been pointed out, but the molecular equivalent proportion of chain extender to the di-epoxy compound should be such that free epoxy groups will always be present in large excess until the setting reaction is essentially completed. This requires that the chain extender be limited to a proportion distinctly less than that equivalent to the di-epoxy compound, and preferably, considerably less than the difference between the number of equivalents of epoxy groups and the number of equivalents of functionally reactive groups in the elastomer. That is, there should be sufficient epoxy material to react with the chain extender, the elastomer, and also the setting agent or hardener. Best results are obtained when the chain extender is in the range of 20% to 60% of equivalency to the di-epoxy compound, and preferably 30% to 50% of equivalency.

The foregoing theoretical explanation is confirmed by the observation that the compositions of this invention can undergo a rather far-reaching reaction and change in physical properties without losing their ability to be molded or otherwise shaped to their final form, nor their ability to bond firmly to surfaces of other material when used as coatings or adhesives, and can then be completely converted or set by simply heating at an appropriate temperature for a suitable time. It is also confirmed by the observation that the composition tends to become opaque during the course of the reaction and that particles of a separate phase can be identified by suitable examination of the finished product.

When properly prepared, the products of this invention exhibit a combination of extremely high strength and modulus with an impact and fracture resistance many times greater than was previously attainable. However, these outstanding results are not attainable unless all four of the specified kinds of ingredients are present in the approximate proportions indicated.

EXAMPLE 1

The following materials are used:

Liquid epoxy resin, which is the di-glycidyl ether of bisphenol A, of average molecular weight 380, and an n value of 0.2 meaning that on an average one out of five molecules contains an additional glycidyl and bisphenol A residue, which results in a pendant hydroxyl in the chain molecule. This is a standard commercial material.

Bisphenol A, which is 2,2' di-hydroxyphenyl propane and is a standard commercial material.

Carboxyl terminated liquid copolymer of butadiene and acrylonitrile of average molecular weight about 3200, containing about 18% acrylonitrile. This is a commercial material sold under the name Hycar CTBN and will be designated as CTBN. It can be prepared by polymerization with azo dicyanovaleric acid initiator as described in Siebert U.S. Pat. No. 3,285,949.

Piperidine.

Compositions are prepared containing the following proportions, in parts by weight, with the results indicated:

|  | A | B | C | D | E |
|---|---|---|---|---|---|
| Liquid epoxy | 100 | 100 | 100 | 100 | 100 |
| Bisphenol A | — | 3.25 | 24 | — | 24 |
| CTBN | — | — | — | 5 | 5 |
| Piperidine | 5 | 5 | 5 | 5 | 5 |
| Tensile strength, psi | 9200 |  | 8405 | 9585 |  |
| Elongation at break, % |  | 10.7 |  | 7.7 | 8.8 |
| Modulus, psi × 10³ |  | 380 |  | 345 | 376 |
| Deflection temperature, °C |  |  |  | 78 | 82 |
| Fracture energy, inch pounds/square inch | 1 | 2 | 2 | 12 | 49 |

In preparing the compositions, all ingredients except the piperidine are thoroughly mixed at 120° to 150° C and the mixture is subjected to a vacuum to remove bubbles. After cooling to below 50° C, the piperidine is carefully mixed in without introducing air bubbles. The mix is then ready for casting, encapsulation, or the like. Test specimens are prepared by casting in a tray lined with poly-tetrafluoroethylene, preheated to 80° C, with brief application of a vacuum if needed for removal of bubbles. The composition is cured 16 hours at 120° C in an oven.

Compositions A, B, and C have adequate strength and hardness, but their use is seriously limited by their brittleness, indicated by the very low value of fracture energy. The fracture energy test and some results obtained with it are described by Rowe, Siebert & Drake in "Toughening thermosets with liquid butadiene/acrylonitrile polymers", Modern Plastics Vol. 47, No. 8, p. 110, August 1970. Composition D, like those described in the foregoing publication, has a much higher fracture energy than A, B, and C, and is accordingly far less brittle. These are all representative of the prior art. Composition E, which is representative of this invention, not only has a very much higher fracture energy than any of the prior art compositions, but has higher strength, elongation, modulus, and deflection temperature than composition D, toughened by simple addition of rubber. These results are the opposite of results generally obtained by previously proposed changes for reducing brittleness, which simultaneously reduce undesirable brittleness and desirable strength and rigidity, and are therefore quite unexpected.

EXAMPLE 2

Compositions are prepared and tested in the same manner as in Example 1, using liquid rubbers similar to CTBN except that the proportion of acrylonitrile in the rubber is varied, with the following results:

|  | F | G | H | I | J |
|---|---|---|---|---|---|
| Liquid epoxy | 100 | 100 | 100 | 100 | 100 |
| Bisphenol A | 24 | 24 | 24 | 24 | 24 |
| Piperidine | 5 | 5 | 5 | 5 | 5 |
| Liquid rubber | 5 | 5 | 5 | 5 | 5 |
| Acrylonitrile in rubber, % | 0 | 14 | 18.6 | 25 | 31 |
| Fracture energy, inch pounds/square inch | 39 | 42 | 47 | 16 | 37 |
| Gardner impact, inch pounds | 240 | 320 | 230 | >320 | >320 |

It is evident that all specimens exhibit a high fracture energy and Gardner impact value. By way of contrast, similar compositions without liquid rubber have fracture energy not over about 2 and Gardner impact values generally below 100 and only occasionally slightly over 100.

EXAMPLE 3

A phenol terminated rubber is prepared by heating CTBN with a slight excess of bisphenol A in the presence of thionyl chloride. For example, 3200 parts by weight of CTBN are mixed with 260 parts thionyl chloride (somewhat over two molar equivalents based on the CTBN, for reaction with the two terminal carboxyl groups of the CTBN). Sulfur dioxide is evolved immediately. Examination of the infrared absorption spectrum shows disappearance of the carboxyl carbonyl bands previously observed in CTBN and appearance of an acid chloride carbonyl absorption band, indicating complete conversion of the carboxyl groups to acid chloride groups. Unreacted thionyl chloride and unvented sulfur dioxide are removed by warming to 50° C and applying a vacuum. The intermediate product is mixed with 500 parts bisphenol A (an equimolar proportion with respect to the thionyl chloride used). Hydrogen chloride is evolved, and after the reaction is apparently terminated, a vacuum is applied for removal of remaining hydrogen chloride. The infrared spectrum shows disappearance of the acid chloride band and appearance of a new carbonyl band characteristic of a phenol ester.

The product consists of the original rubber backbone with each terminal carboxyl group esterified by one of the phenolic hydroxyl groups of the bisphenol A and the other phenolic hydroxyl being the new terminal group. It is accordingly a phenol terminated elastomer. It is incorporated into an epoxy composition in the same manner described in Example 1, replacing the CTBN of Example 1-E. Fracture energy is found to be an average of 44 inch pounds per square inch.

EXAMPLE 4

A phenol terminated rubber is prepared by reacting CTBN with a large excess of bisphenol A and a small amount of p-toluenesulfonic acid. Thus, 1000 parts CTBN are mixed with 300 parts bisphenol A (over 4 molar equivalents based on the CTBN) and one-half part of p-toluenesulfonic acid dissolved in acetone, and heated to 150° C for 2 hours. The product when titrated with alcoholic potash shows a reduction of acidity from a value equivalent to 2.70% COOH in the original CTBN to a much smaller value equivalent to 0.74% COOH. The infrared spectrum shows a carbonyl absorption band shifted from the previous carboxyl carbonyl band. Since the terminal carboxyl groups in CTBN originate from the azo dicyanovaleric acid initiator which has the cyano group on the third carbon from the carboxyl carbon, it is believed that the cyano and carboxyl groups combine to form a six-membered glutarimide ring with which the bisphenol A forms an adduct, leaving the second phenolic hydroxyl of the bisphenol A as a new terminal group.

The excess bisphenol A does not need to be removed, as it is a normal constituent of the final composition of this invention. Accordingly, the reaction product just described is incorporated into an epoxy composition in the manner described in Example 1, replacing the CTBN of Example 1-E. Fracture energy of different specimens is found to be 30 to 107 inch pounds per square inch, with an average of 55 inch pounds per square inch.

EXAMPLE 5

Liquid epoxy resin 100 parts is mixed with 24 parts bisphenol A, 5 parts HTBN (a commercially available liquid rubber which is a hydroxy-ethyl ester of CTBN) and 5 parts piperidine and cured in the manner described in Example 1. The fracture energy is 20 to 40 inch pounds per square inch.

EXAMPLE 6

An epoxy terminated elastomer is prepared by dissolving 1000 parts liquid epoxy resin with 800 parts CTBN and 1 part p-toluenesulfonic acid in about 3500 parts benzene and heating under total reflux for six hours, after which the benzene is distilled off. The infrared spectrum shows disappearance of the hydroxyl and carbonyl absorption bands and increase in intensity of the ester carbonyl absorption band. The product consists of a mixture of unreacted diglycidyl ether of bisphenol A (the main constituent of the liquid epoxy resin used) and the tetra-epoxy ester resulting from esterification of the carboxyl group of the CTBN with the pendent hydroxyl groups of the high molecular weight fraction of the epoxy resin. When this product is mixed with additional epoxy resin, bisphenol A, and piperidine and cured in the manner described in Example 1, a strong non-brittle product results.

The foregoing examples involve use of a liquid diglycidyl ether of bisphenol A since it is the most widely used and convenient epoxy resin material. However, similar results are obtained using diglycidyl ethers of bisphenol A having a higher molecular weight and therefore a longer chain of atoms between the terminal epoxy groups, but since they are solids at room temperature they are more difficult to handle.

Also, other epoxy compounds of various origins can be used in similar ways to replace the diglycidyl ether of bisphenol A, as was previously mentioned.

In addition, there are a great many functionally terminated elastomers which give the same kind of unexpected results in toughening epoxy compounds without reduction of strength and rigidity when incorporated with the other ingredients specified herein. Typical materials include mercapto terminated copolymers of isoprene and acrylonitrile, carboxyl terminated polybutadiene or carboxyl terminated copolymers of butadiene and styrene or of isoprene and acrylonitrile, hydroxyl terminated copolymers of butadiene and acrylonitrile, carboxyl terminated poly-acrylic esters, mercapto terminated poly-acrylic esters, functionally terminated polyethers such as amine terminated poly-tetramethyleneoxide or poly-epichlorohydrin or polyethylene oxide, all of which can be incorporated into epoxy compositions of the kinds described with the same good results.

While it is not possible to explain fully why the particular type of combination specified above should give the unexpected results in toughening of epoxy resins without the expected loss of strength and rigidity, it is believed to be dependent on appearance of particles or domains of a separate phase of elastomeric material in very small dimensions and in a critically small proportion to the total volume of matrix material, and also to be dependent on bonding of the separate phase to the matrix material.

Thus, replacement of the functionally terminated elastomers of this invention with ordinary elastomers having the same kind of backbone structure but not capable of bonding to epoxy compositions does not give this kind of improvement.

The mixture of the principal ingredients in liquid or molten form is believed to be important in assuring initial distribution of the several ingredients uniformly throughout the mass. The presence of substantial proportions of a diphenol or other chain lengthening material is believed to be important in changing solubility relationships so that the elastomer can separate during the early part of the hardening reaction as a separate phase in very small particles distributed throughout the mass. The final cross-linking then completes the hardening and sets the epoxy matrix and assures firm bonding of the elastomer particles to the matrix.

The improvements of this invention are not simply flexibilizing. Flexibilizing reduces the strength and the modulus of the product, and therefore diminishes the value of products for many purposes where rigidity of maintenance of dimension is important. Here a manyfold improvement in toughness is achieved unexpectedly with essentially no reduction and sometimes even an increase in strength and stiffness.

We claim:

1. An epoxy resin composition yielding high strength, high modulus, high impact resistant, thermoset products, comprising a di-epoxy compound, a less than equivalent proportion of a diphenol chain lengthening material, a functionally terminated elastomer which is a material having no functional groups other than two terminal phenolic hydroxyl groups, in an amount not over about 7½% by weight of the di-epoxy compound, and a curing agent for the epoxy compound.

2. A composition as in Claim 1, in which the functionally terminated elastomer is for most of the polymer chain a copolymer of a major proportion of butadiene and a minor proportion of acrylonitrile, and is present in an amount of about 5% by weight of the di-epoxy compound.

3. A composition as in claim 2, in which the di-epoxy compound is the diglycidyl ether of bisphenol A, the diphenol is bisphenol A, and the curing agent is a nitrogen base reactive at elevated temperatures.

4. A method of producing high strength, high modulus, high impact resistant, thermoset epoxy resin products, comprising the preliminary step of preparing a functionally terminated elastomer having a reactivity toward epoxy groups comparable to the reactivity of epoxy groups toward each other by reacting a di-carboxyl terminated elastomer with at least twice the equivalent proportion of a difunctional compound whose functional groups have a reactivity toward epoxy groups comparable to the reactivity of epoxy groups toward each other, and mixing a di-epoxy compound with a less than equivalent proportion of a chain lengthening material, with an amount of the functionally terminated elastomer not over about 7½% by weight of the di-epoxy compound, and a curing agent for the epoxy compound, shaping the mixture, and heating to cross-link and set it.

5. A method as in claim 4, in which a di-carboxyl terminated copolymer of butadiene and a minor proportion of acrylonitrile is reacted with at least twice the equivalent proportion of a diphenol.

6. A method as in Claim 4, in which the di-epoxy compound is the diglycidyl ether of bisphenol A, the chain lengthening material is bisphenol A, the functionally terminated elastomer is the product of a preliminary reaction of a diphenol with a carboxyl terminated copolymer of butadiene and a minor proportion of acrylonitrile, and the curing agent is a nitrogen base reactive at elevated temperatures.

* * * * *